United States Patent Office 3,290,350
Patented Dec. 6, 1966

3,290,350
α,α,α',α' - TETRAMETHYL - XYLYLENE DIISOCYANATES AND α,α-DIMETHYLISOPROPENYLBENZYL ISOCYANATES AND THE PREPARATION THEREOF FROM ISOCYANIC ACID AND OLEFINS
Fred W. Hoover, Wilmington, Del., assignor to E. I. du Pont de Nemours and Company, Wilmington, Del., a corporation of Delaware
No Drawing. Filed Dec. 27, 1962, Ser. No. 247,512
12 Claims. (Cl. 260—453)

This application is a continuation-in-part of my copending, coassigned application Serial No. 29,134, filed May 16, 1960, now abandoned.

This invention relates to a novel process for making isocyanates, to a certain new class of isocyanates prepared thereby, to polymers of such isocyanates and to post-reaction products of such polymers.

Isocyanates are a reactive class of compounds that have achieved considerable importance as intermediates. For example, they react with compounds containing Zerewitinoff active hydrogen, e.g., those bearing amine, carboxyl, and hydroxyl groups. Polyisocyanates are particularly important since they react with compounds containing a plurality of such reactive groups, particularly amine or hydroxyl groups, to form polymers or to cross-link polymers containing a plurality of such groups.

The synthesis of isocyanates has, of course, received considerable attention. In general, isocyanates and particularly diisocyanates have been obtained by reaction of amines with phosgene. For many desired isocyanates, the necessary intermediates for such methods are difficult to obtain. A more versatile synthetic method would be of considerable value in providing new as well as old isocyanates.

There has now been discovered a process for making isocyanates which comprises reacting isocyanic acid with a vinylidene compound having the formula (1) 

where $R_1$ is selected from the group consisting of hydrogen and hydrocarbyl of up to 12 carbon atoms (i.e., not more than 12 carbons), $R_2$ contains up to 12 carbon atoms and is selected from the group consisting of hydrocarbyl and substituted hydrocarbyl wherein the substituent is inert to isocyanic acid and is bonded to a carbon atom at least two atoms removed from the depicted ethylenic linkage, and $R_1$ and $R_2$ conjointly ($—R_1—R_2—$) are a hydrocarbylene group of 2 to 12 carbon atoms.

Isocyanates prepared by this process generally have the formula (2) 

where $R_1$ and $R_2$ are as previously defined, although polyisocyanates are also available from compounds having more than one vinylidene group. Included within Formula 2 are the isocyanates of this invention, which correspond to Formulas 3 and 4 below.

By the process of this invention, the isocyanic acid is contacted with at least one vinylidene compound of Formula 1 at a temperature in the range of from about 25 to 200° C. The isocyanato (—NCO) group generally becomes attached to the carbon which bears the most substituents. Preferred process temperatures for this addition reaction are from about 75 to 150° C. Higher temperatures are generally avoided to minimize polymerization of the ethylenically unsaturated vinylidene compounds and the isocyanic acid. If temperatures above about 150° C. are employed, it is usually desirable to use a polymerization inhibitor such as hydroquinone or the like.

Although an acid catalyst is not essential for the reaction, it is preferred that one be employed because maximum yields are thus obtained. By the term "acid catalyst" is meant a compound having an open sextet of electrons (see Whelan, "Advanced Organic Chemistry," Wiley, N.Y., 1949, 2nd ed., page 80, and Branch and Calvin, "The Theory of Organic Chemistry," Prentice-Hall, N.Y., 1941, pages 186–7).

The preferred acid catalysts are materials which act as strong acids in aqueous solutions to produce pH values of not more than about 3 and pKa values of not more than about 2. In general, suitable (strong) acid catalysts include metaphosphoric acid, sodium bisulfate, sulfamic acid, boron trifluoride, and zinc chloride. Also useful are salts of strong acids, such as the above, with weak bases such as ammonia or amines and silver or copper hydroxides. Although the amount of acid catalyst used is not critical, it will generally range from 0.1 to 10% by weight (based on total weight of reactants).

Preferably the reactants are contacted in a mutual solvent or an inert diluent, e.g., a hydrocarbon. Particularly useful are benzene, toluene, xylene, heptane. Ethers such as tetrahydrofuran can also be used but are less preferred. The diluent should be liquid under the reaction conditions, generally boiling between 50–150° C., and non-reactive with the reactants and acid catalyst (if used). Preferably, the inert diluent, which can be present in amounts up to 5 to 10 times or more based on the reactants, has a molecular weight of 70–140.

In general, the two reactants, i.e., the vinylidene compound and the isocyanic acid, are employed in substantially equivalent amounts. However, the proportions of reactants are not critical, and the mole ratio of isocyanic acid to vinylidene compound can range in molar amounts from about one-half (e.g., as when excess vinylidene compound is present to serve as solvent) to ten or more. When the vinylidene compound contains more than one vinylidene group, the number of isocyanato radicals in the principal final product will be proportional to the molar ratio of isocyanic acid to vinylidene group.

The time needed for reaction is generally not long, e.g., times of from a few minutes to an hour are usually sufficient. As one would expect, increases in temperature tend to promote rates of reaction. The time and temperature generally depend upon the rate of reaction of isocyanic acid with the ethylenically unsaturated compound.

The reaction is usually carried out under pressure to achieve useful concentrations of reactants, particularly at elevated temperatures. Autogenous pressure is most convenient although not necessary for the reaction. The pressure can vary from atmospheric to a hundred or more atmospheres. Isolation of the product is by usual methods, e.g., by distillation.

In Formulas 1 and 2 the term "hydrocarbyl" is used in its conventional sense to refer to a monovalent radical composed of carbon and hydrogen and includes, for example, such specific radicals as alkyl, cycloalkyl, aryl (especially phenyl), alkenyl, alkaryl, aralkyl and alkenaryl, and the term "hydrocarbylene" refers to the corresponding divalent radical, e.g., alkylene and aralkylene. Usually, $R_1$ and $R_2$, whether taken singly in the form of separate radicals or together to form a cyclic structure, contain not more than three ethylenic (non-aromatic) double bonds, and preferably not more than one. Each of these radicals can contain acetylenic bonds but usually will contain no more than one, as in propargyl.

As noted above, when $R_1$ and $R_2$ are hydrocarbyl radicals, such radicals contain not more than 12 carbon atoms. Preferably, however, $R_2$ contains not more than 6 carbon atoms and $R_1$ contains not more than 10 carbon atoms. Examples of cyclic hydrocarbyl radicals include phenyl, naphthyl, cyclopropyl, cyclobutyl, cyclopentyl, cyclohexyl and cyclohexenyl. Examples of non-cyclic hydrocarbyl radicals include methyl, vinyl, ethynyl, allyl, hexyl, hexatrienyl, octyl, decyl, etc. Examples of inert substituents for substituted hydrocarbyl groups, wherein the substituent is bonded to a carbon atom at least two atoms removed from the ethylenic linkage, are halogen,

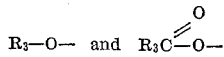

wherein $R_3$ is a hydrocarbyl group, the number of carbons in $R_3$ being such that the number of carbons in each of $R_1$ and $R_2$ does not exceed 12. Generally $R_3$ will contain up to 6 carbons and preferably is lower alkyl. Thus, preferred substituted hydrocarbyl radicals include chlorophenyl, bromophenyl, beta-ethoxy-ethyl, methoxyphenyl, and acetoxyphenyl.

The preferred hydrocarbylene groups are those which are free of non-aromatic unsaturation, particularly those of 3 to 5 carbons in chain length and a total of up to 10 carbons, e.g., $-(CH_2)_{3-5}-$, phenylpentamethylene and ethyltetramethylene.

Examples of suitable vinylidene compounds are alpha-vinylnaphthalene, divinylbenzene, vinylcyclohexane, o-chlorostyrene, o-fluorostyrene, 1,1-diphenylethylene, 1,1-dinaphthylethylene, 1 - ethoxy-3-butene, alpha-n-hexyl-styrene, p-diisopropenylbenzene, 1 - vinyl-3-isopropenyl-benzene, isoprene, 2-methyl-1 - hexene, methylenecyclopropane, methylenecyclohexane and limonene.

The new isocyanates of this invention are those characterized by the formulas (3)      $H_2C=C(CH_3)-Arylene-C(CH_3)_2NCO$ and (4)      $(OCN)(CH_3)_2C-Arylene-C(CH_3)_2NCO$ wherein "Arylene" (Ar) refers to a divalent aromatic hydrocarbon group. In general, the arylene (Ar) moiety in Formulas 3 and 4 will contain up to 10 carbon atoms, and preferably, it will not contain more than 7 carbons, as in phenylene and methylphenylene. The most preferred individual compounds of Formulas 3 and 4 are those wherein the arylene moiety is m-phenylene because they are particularly useful in polymer-forming reactions, as will hereinafter more fully appear.

Isocyanates are known to react with chemical compounds or reagents which contain reactive hydrogen, as determined by the Zerewitinoff method [J. Am. Chem. Soc., 49, 3181 (1927)]. Hereinafter, Zerewitinoff active hydrogen will sometimes be referred to as "active hydrogen." Active hydrogen is present in water, amines, aliphatic alcohols, phenols, acids and thiols, i.e., in compounds having hydrogen attached to nitrogen, oxygen or sulfur.

The mono- and diisocyanates provided by the process of this invention react with compounds containing Zerewitinoff active hydrogen to yield a variety of useful products. To illustrate, the monomeric isocyanates react with polymeric materials containing active hydrogen, e.g., cellulose or cellulosic derivatives to modify the properties of the polymer, and thus serve as textile treating agents. The diisocyanates prepared by the process of this invention react with difunctional active hydrogen-containing compounds to form polymers which are useful for the preparation of films, fibers, coatings and molded objects by conventional techniques. Also, the diisocyanates can be used to crosslink polymers containing Zerewitinoff active hydrogen. Some of these as well as various other utilities of compounds prepared by the process of this invention are discussed in greater detail below.

Monoisocyanates such as those of Formula 3, which have both an isocyanato group and a carbon-carbon double bond (i.e., where only one of a plurality of ethylenic linkages react with isocyanic acid), can be polymerized by conventional methods using known addition polymerization initiators, such as those of the free radical type, e.g., peroxy and azo initiators, to produce novel film-forming addition polymers, including homopolymers, copolymers, terpolymers, etc. Such polymers constitute another aspect of this invention.

Linear homopolymers of a compound of Formula 3 are particularly useful as precursors for crosslinked polymeric materials such as those produced by post-reaction with compounds containing active hydrogen. One useful class of homopolymers contains at least 5, and preferably from about 5 to 50, recurring structural units of the formula (5) 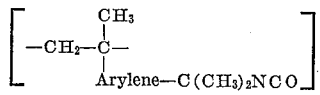

For example, α,α-dimethyl-m-isopropenyl benzyl isocyanate (see Example VI) forms homopolymers having generally 5–50 recurring units of the general type (6) 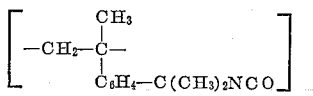

These new polymers react with active hydrogen-containing compounds to form crosslinked polymeric products useful as films, fibers, coatings or molded objects.

When polymerization of a compound of Formula 3 is effected in the presence of other ethylenically unsaturated monomers capable of addition polymerization, copolymers are formed which contain recurring units of Formula 5. Such copolymers are useful, per se, as films, fibers or adhesive coatings, or they can be post-reacted by treatment with mono- and difunctional active hydrogen-containing compounds to obtain highly inert, heat- and solvent-resistant polymers useful in the form of films, fibers, coatings or shaped objects. Suitable comonomers include simple olefinic compounds, e.g., styrene and alpha olefins such as ethylene, propylene, isobutylene, 1-butene, 1,3-butadiene, 1-pentene, 1-hexene, 1,4-hexadiene and 1-octene; vinyl and vinylidene halides, e.g., vinyl fluoride, vinyl chloride, vinylidene fluoride and vinylidene chloride; vinyl esters, e.g., vinyl acetate and vinyl benzoate; vinyl ketones, e.g., methyl vinyl ketone and methyl isopropenyl ketone; acrylic and methacrylic esters and nitriles, e.g., ethyl acrylate, methyl methacrylate, methacrylonitrile; and substituted ethylenes, e.g., trifluoroethylene, chlorotrifluoroethylene and tetrafluoroethylene. The preferred comonomers are the alpha olefins, particularly those of 2–8 carbons.

Diisocyanates prepared by the process of this invention, including those of Formula 4, react with polyfunctional active hydrogen-containing compounds to form what are conventionally known as condensation polymers. Such polymers, which constitute another aspect of this invention, are of high molecular weight and are useful for the formation of fibers, films, coatings and molded objects by conventional techniques. Examples of difunctional compounds containing active hydrogen are dibasic acids, glycols, diamines, dithiols, amino acids, and amino alcohols. These compounds are illustrated by oxalic acid, adipic acid, hexamethylene glycol, decamethylene glycol, polytetramethylene oxide glycol, polyethylene oxide glycol, decamethylenediamine, hexamethylenediamine, ethylenediamine, methanedithiol, β-aminopropionic acid, caprolactam, and ethanolamine. Although heteroatoms can be present in the chain separating the functional groups, as in polyethylene oxide glycols, it is preferred that 4–12 chain carbons separate the functional groups.

Polyurethanes and polyureas prepared from diisocyanates of Formula 4 are markedly superior in their resistance to ultraviolet light and to oxidation as compared to corresponding structures derived from aromatic diisocyanates or from other tertiary isocyanates that have hydrogen bonded to the carbons directly attached to the isocyanato groups. These unexpectedly superior properties of the polyurethanes and polyureas prepared from my isocyanates apparently result from the absence of hydrogen on the carbons alpha to the isocyanate groups. Polyurethanes from glycols such as polytetramethylene oxide glycol and polyethylene oxide glycol and ureas from aliphatic diamines such as hexamethylenediamine and decamethylenediamine have shown these improved properties. Polymers obtained with diamines having no alpha-hydrogens, such as $H_2NC(CH_3)_2CH_2CH_2C(CH_3)_2NH_2$, were particularly outstanding.

Preferred difunctional compounds for reaction with diisocyanates of Formula 4 are those having carboxylic acid, alcoholic hydroxyl and/or primary amino groups separated by 4–12 chain carbons. The preferred coreactants can be represented by the formula (7)  $\qquad$ X—Q—Y where Q is an alkylene group of at least 4 carbons in chain length and having a total of up to 12 carbons, and X and Y are —OH, —$NH_2$ or —COOH and are terminal groups bonded to opposite ends of the alkylene chain. For the preparation of light-stable and oxidation resistant polyureas, diamines of Formula 7 which contain no alpha-hydrogens are particularly preferred.

Reaction between the difunctional active hydrogen-containing compounds and the diisocyanates takes place under a wide range of conditions, e.g., at temperatures of 0 to as high as 200° C. The reaction to form new polymers such as polyurethanes is effected under liquid phase reaction conditions. The polymers thereby formed will generally have molecular weights in the range of 5,000 to 167,000 or even higher. The resulting polymers are particularly useful in the preparation of coatings for application to metals. Molded objects such as buttons can be formed from the polymers. Polymers from α,α,α′,α′-tetramethyl xylyene diisocyanates are particularly useful for coatings, adhesives, textile treating agents, molded objects, etc., by virtue of their superior stability to degradation by heat or light.

As mentioned above, homopolymers and copolymers of the isocyanates of Formula 3 are highly useful for the formation of post-reaction products. Because such polymers contain reactive sites (i.e., the pendant isocyanato groups), they undergo post-reactions with chemical reagents containing Zerewitinoff active hydrogen. The temperature and pressure at which the polymer and the active hydrogen-containing compound are reacted is not critical and will necessarily depend upon the particular reactants employed. An appropriate temperature can be determined by heating a mixture of the polymer and reagent at increasingly higher temperatures until the desired degree of reaction occurs, as evidenced by the properties of the post-reaction product. Generally, the temperature will be at least 100° C. When films, laminates, and shaped articles are desired, the reaction is conveniently carried out by contacting the polymer and reagent under melt-press conditions to simultaneously effect the reaction and shape the reaction product. The temperature and pressure employed under such circumstances will, of course, depend upon the softening point of the polymer employed. Although the polymer and active hydrogen-containing compound will react in the absence of a catalyst, a catalyst such as dibutyltin dilaurate or triethylamine is preferably employed to increase the yield of post-reaction product.

The monomeric, polymeric and post-reaction products of this invention and their methods of preparation are described in further detail in the following examples, in which the proportions of ingredients are expressed in parts by weight unless otherwise specified.

*Example I*

$\phi C(CH_3)=CH_2+HNCO \rightarrow \phi C(CH_3)_2NCO$

A mixture of 50 g. of benzene, 24 g. of α-methylstyrene, 24 g. of isocyanic acid, and 0.3 g. of p-toluenesulfonic acid monohydrate was placed in a 200-ml. stainless steel vessel, which was sealed and then heated with rocking for eight hours at 100° C. On distillation through a Vigreux column, 6.5 g. (10% of α,α-dimethylbenzyl isocyanate, B.P. 58–59° C. at 1.85 mm., $n_D^{25}$ 1.5062, was obtained. The infrared and n-m-r spectra agreed with this structure The aniline derivative melted at 197° C. (Lambert and Rose, J. Chem. Soc. 42 (1949), give 193–194° C.)

*Example II*

When the reaction of Example I of isocyanic acid and α-methylstyrene was carried out in sulfur dioxide instead of benzene without p-toluenesulfonic acid, a 7% conversion of α-methylstyrene to α,α-dimethylbenzyl isocyanate was obtained.

*Example III* p-$CH_3OC_6H_4C(CH_3)=CH_2+HNCO \rightarrow$
$\qquad$ p-$CH_3OC_6H_4C(CH_3)_2NCO$ A mixture of 5 ml. of toluene and 12.5 g. of p-methoxy-α-methylstyrene was added with stirring over a period of 85 minutes to a mixture of 16 ml. of isocyanic acid, 30 ml. of toluene, and 0.1 g. of p-toluenesulfonic acid monohydrate. A mild exothermic reaction occurred. On distillation, the following fractions (excepting the toluene fraction) were obtained: (1) 0.62 g., B.P. 42–49° C./0.5 mm., (2) 0.76 g., B.P. 49° C./0.45 mm., (3) 0.76 g., B.P. 75–90° C./0.5–0.7 mm., (4) 2.0 g., B.P. 92° C./0.7 mm., and (5) residue, 8.3 g. Both (3) and (4) were largely p-methoxy-α,α-dimethylbenzyl isocyanate. The infrared spectra indicated the presence of p-methoxystyrene along with the isocyanate.

Analysis of (4).—Calcd. for $C_{11}H_{13}O_2N$: N, 7.31%; M.W., 191. Found: N, 6.48%; M.W., 178–182.

*Example IV*

A mixture of 57 ml. of benzene, 21 g. of styrene, 22 ml. of isocyanic acid, 0.5 g. of hydroquinone, and 0.3 g. of p-toluenesulfonic acid monohydrate was heated in a 200-ml. stainless steel container with rocking for eight hours at 100° C. After removing the benzene and unreacted styrene, there remained 1.5 g. of a liquid. The infrared spectra of this liquid showed the presence of —NCO groups as in $\phi CH(NCO)CH_3$.

*Example V*

$(CH_3)_2C=CH_2+HNCO \rightarrow (CH_3)_3CNCO$

A mixture of 200 ml. of toluene, 36 ml. of isocyanic acid, 28 g. of isobutylene, and 0.5 g. of p-toluenesulfonic acid monohydrate was heated eight hours at 100–110° C. in a 500-ml. stainless steel sealed container. On distillation, there was obtained 5 g. of t-butyl isocyanate, B.P. 85° C. (agreeing with that of Bühler and Fierz, Helv. Chim. Acta. 26, 2123–36 (1943)). The n-m-r spectra of the product showed that $CH_3$ groups were present.

t-Butyl isocyanate was also obtained by passing isocyanic acid and isobutylene over a phosphoric acid catalyst at 125–150° C.

When the above procedure was repeated except xylene and sulfuric acid were used, t-butyl isocyanate was also obtained.

*Example VI*

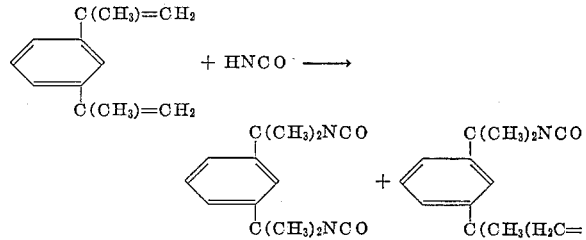

A mixture of 200 ml. of toluene, 48 g. of isocyanic acid, 15.8 g. of m-diisopropenylbenzene, 1 g. of hydroquinone, and 0.3 g. p-toluenesulfonic acid monohydrate was heated in a bomb for two hours at 100° C. More isocyanic acid (54 g.) was added and the resultant mixture heated 11 hours at 100° C. On distillation, four fractions were obtained (in addition to toluene): (1) 5.0 g., B.P. 52–72° C./.18 mm., $n_D^{25}$ 1.5244, (2) 5.6 g., B.P. 72–82° C./0.18 mm., $n_D^{25}$ 1.5139, (3) 2.1 g., B.P. 82–85° C./0.17–0.20 mm., (4) 0.7 g., B.P. 92° C./0.4 mm., $n_D^{25}$ 1.5138, and (5) residue, 1.8 g.

Fraction (4) was α,α,α',α'-tetramethyl m-xylylene diisocyanate:

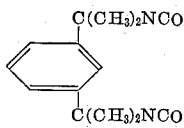

Analysis of fraction (4).—Calcd. for $C_{14}H_{16}N_2O_2$: C, 68.83%; H, 6.60%; N, 11.48%. Found: C, 69.14; H, 6.66%; N, 11.42, 11.55%.

The infrared spectra of (4) agreed with this structure. The infrared and near infrared spectra of the other fractions showed that they were mixtures of the mono- and diisocyanates. A gas chromatogram of fraction (1) showed that it contained 74% of α,α-dimethyl-m-isopropenyl benzyl isocyanate

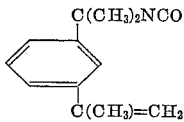

21% of the diisocyanate, and 2% of m-diisopropenylbenzene.

Repetition of the above general procedure, using larger amounts of reactants and ammonium tosylate as the catalyst, gave a 32% yield (based on the m-diisopropenylbenzene) of the monoisocyanate boiling at 83–85/0.9 mm. and 35% of the diisocyanate boiling at 100–106°/0.9 mm. The analysis for the monoisocyanate follows:

Calc'd. for $C_{13}H_{15}NO$: C, 77.57; H, 7.51; N, 6.96. Found: C, 77.20; H, 6.97; N, 7.22.

When 0.20 g. of hexamethylenediamine and 0.42 g. of the above diisocyanate were reacted in 5 ml. of dimethylformamide, an insoluble polymer quickly formed. This polymer could be molded into tough rigid articles.

Polyurethanes prepared from this diisocyanate and hexamethylene glycol were useful in coating materials, e.g., on wood, glass, or metal.

The residue (5) contained isocyanato groups and corresponded to polymers of the ethylenically unsaturated monoisocyanate (see fraction (1)). Thin films of this residue were treated with dibutyltin dilaurate and the resultant film air dried to a tack-free, hard film in a day. Faster curing times were obtained by the addition of other compounds, e.g., when an equivalent amount of m-phenylenediamine was added to the residue and a film cast, it was converted to a hard product in an hour.

Example VII $CH_2=C(CH_3)C(CH_3)=CH_2+HNCO \rightarrow CH_2=C(CH_3)C(H_3)_2NCO$ A mixture of 200 ml. of benzene, 22 g. of 2,3-dimethylbutadiene, 53 g. of isocyanic acid, and 7.4 g. of anhydrous p-toluenesulfonic acid was heated in a bomb for eight hours at 100° C. Distillation gave the following fractions:

| B.P. ° C./mm.: | Wt. (g.) |
|---|---|
| (1) 44/152–40/100 | 1.60 |
| (2) 47–61/100 | 0.85 |
| (3) 61–68/100 | 1.44 |
| (4) 68–69/100 | 1.96 |
| (5) 37–32–29/11 | 1.0 |
| (6) 44/2.0–48/1.8 | 0.13 |
| (7) 52/1.8–56/1.45 | 1.27 |
| (8) 61/0.35 | 1.24 |
| Residue | 8.5 |

Infrared, near infrared, and n-m-r showed that (4) was largely $CH_2=C(CH_3)C(CH_3)_2NCO$.

Analysis of (4).—Calcd. for $C_7H_{11}NO$: C, 67.2%; H, 8.8%; N, 11.2%. Found: C, 68.67%; H, 9.14%; N, 10.01%.

Example VIII

A mixture of 100 ml. of toluene, 100 ml. of α-methylstyrene, 27 ml. of isocyanic acid, 3 g. of catalyst, and 1 g. of hydroquinone was heated eight hours at 100° C. in a sealed vessel. The α,α-dimethylbenzyl isocyanate was determined by infrared analysis.

Without catalyst, about a 3% conversion results. With ammonium tosylate, 30% conversion; ammonium perfluoroisobutyrate, 21%; silver perfluoroisobutyrate, 17%; 2-ethylhexylammonium, 2,2,2-trifluoroethyl sulfonate, 10%; anhydrous hydrogen chloride as catalyst gave a 40% conversion.

Example IX

To 10 ml. of xylene containing 0.5 ml. of boron trifluoride etherate was added over a period of two hours a mixture of 20 ml. of xylene, 13.2 ml. of isocyanic acid, and 11.8 g. of α-methylstyrene. Heating (at 100° C.) was continued for an additional three hours. The pressure on the mixture was less than 2 atmospheres. A 10% conversion to α,α-dimethylbenzyl isocyanate resulted.

Example X

A mixture of 87 g. of isoprene, 210 ml. of benzene, 86 g. of isocyanic acid, 2 g. of ammonium tosylate, and 1 g. of hydroquinone was heated three hours at 100° C. Distillation of the product through a precision still gave 5 g. of $CH_2=CHC(CH_3)_2NCO$, B.P. 45–50° C./44 mm., and also higher-boiling isocyanates. The infrared spectrum of $CH_2=CHC(CH_3)_2NCO$ showed bands at 2.7μ (characteristics of tertiary isocyanates of this type), 4.4μ (NCO), 6.1μ (>C=C<), 7.28μ and 7.37μ (gemdimethyl), and 10.15μ and 10.85μ ($CH_2=C<$). The proton magnetic spectrum was also consistent with this structure.

This product, $CH_2=CHC(CH_3)_2NCO$, reacted exothermically with 2-ethylhexylamine to produce the urea, $CH_2=CHC(CH_3)_2NHCONHC_8H_{17}$, named 1-(2-ethyl hexyl)-3-(1,1-dimethyl-2-propenyl)urea. Infrared analysis confirmed the structure.

Analysis.—Calc'd for: $C_{14}H_{28}N_2O$: N, 11.6%. Found: N, 11.1%.

Compounds of this type have utility as plant growth regulants.

Example XI

A mixture of 300 ml. of toluene, 60 g. of $CH_3CO_2CH_2CH_2C(C_6H_5)=CH_2$, 90.6 g. of isocyanic acid, 1.5 g. of ammonium tosylate, and 0.5 g. of hydroquinone was heated three hours at 100° C. Infrared analysis of the distilled products showed that

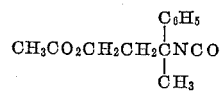

was present in the distillate.

Example XII

A mixture of 300 ml. of toluene, 35 g. of p-diisopropenylbenzene, 93 g. of isocyanic acid, 1.4 g. ammonium tosylate, and 0.7 g. of hydroquinone was heated in a stainless steel bomb for three hours at 100° C. On distillation, there was obtained four fractions: (1) 1.0 g., B.P. 75° C./0.55 mm., (2) 1.5 g., B.P. 75–102° C./0.65 mm., (3) 4 g., B.P. 102–109° C./0.6 mm., M.P. 72° C., and (4) 1.5 g., B.P. 109–120° C./0.6 mm. There was 22 g. of a nondistillable residue which contained a large percentage of NCO groups as shown by infrared. Infrared and gas chromatographic analyses showed that fractions 3 and 4 were substantially all

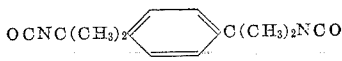

whereas, fractions 1 and 2 contained both this diisocyanate and the monoisocyanate,

Example XIII

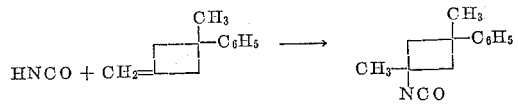

A mixture of 17 g. of 3-methyl-3-phenylmethylenecyclobutane, 60 g. of isocyanic acid, 1 g. of ammonium tosylate and 300 ml. of toluene was heated for three hours in a 500-ml. stainless steel container. On distillation, there was obtained 7 g. of unreacted 3-methyl-3-phenylmethylenecyclobutane and 1.9 g. of 1,3-dimethyl-3-phenylcyclobutanyl isocyanate, B.P. 60–64°/0.4 mm., $n_D^{25}$ 1.5255. The structure of this product was confirmed by infrared analysis.

The following examples further illustrate the preparation of polymers of this invention.

Example XIV

A charge of 4.88 g. of $\alpha,\alpha,\alpha',\alpha'$-tetramethyl m-xylylene diisocyanate (see Example VI) and 2.92 g. of adipic acid was heated at 147–150° C. for 2½ hours. The polymeric product was solid at 100° C. and was hard and tough. It was soluble in diglyme from which hard protective coatings could be formed. It could also be molded at about 150° C. to form shaped objects.

Example XV

When 0.20 g. of hexamethylenediamine and 0.42 g. of the diisocyanate used in Example XIV were reacted in 5 ml. of dimethylformamide, an insoluble polymer quickly formed. This polymer could be molded into tough rigid articles.

Example XVI

Polyurethanes prepared from the diisocyanate as used in Example XIV and hexamethylene glycol by heating at 60–80° C. were useful in coating materials, e.g., on wood, glass, or metal. In this reaction the polymerization rate is increased if a catalyst, especially a base, e.g., a tertiary amine, is present.

Example XVII

A homopolymer of $\alpha,\alpha$-dimethyl-m-isopropenyl benzyl isocyanate (Example VI) was obtained as follows: A mixture of 25 ml. of isooctane, 5 g. of the isocyanate, and 0.1 ml. of $BF_3$ etherate was prepared at −73° C. It was permitted to warm to room temperature and after three days the polymer isolated. The homopolymer softened at about 60° C. and had a molecular weight of about 1500. It was insoluble in xylene but soluble in dimethylformamide from which films could be cast and further hardened by use of a catalyst, such as dibutyltin dilaurate.

Example XVIII

Copolymers of ethylene and $\alpha,\alpha$-dimethyl-m-isopropenyl benzyl isocyanate (Example VI) were prepared as follows:

A pressure-resistant vessel of 300 ml. capacity was charged with 112 ml. of benzene, 0.2 g. of 1,1-azodicyclohexane carbonitrile, and varying amounts of $\alpha,\alpha$-dimethyl-m-isopropenyl benzyl isocyanate as shown in the table below. The vessel was then pressured with ethylene to 3500 lb./sq. in. and heated to 115–125° C. Ethylene was added during the reaction to maintain the pressure at between 12,000 and 12,500 lb./sq. in. When a total of 20 g. of ethylene had been added, the reaction vessel was cooled and excess ethylene removed. The polymer was dissolved in refluxing benzene and subsequently cooled to precipitate the copolymer and remove any unreacted isocyanate. All of the polymers contained nitrogen and had infrared absorption at 4.45μ, indicative of the presence of an isocyanate group.

|   | Isocyanate (grams) | Yield of Polymer (grams) | Inherent Viscosity of Polymer | Mole Percent Isocyanate in Polymer |
|---|---|---|---|---|
| A | 0.5 | 13.2 | 0.77 | 0.34 |
| B | 0.7 | 23.4 | 0.79 | 0.39 |
| C | 1 | 7.9 | 0.82 | |
| D | 1.4 | 4.5 | 0.47 | 3.10 |
| E | 2 | 6.1 | 0.06 | 6.88 |
| F | 4 | 5.8 | 0.09 | |

The ethylene copolymer corresponding to B in the above table, when pressed into a film of 3.27 mil thickness, had a modulus of 44,700 lb./sq. in. (much higher than for polyethylene), an elongation of 66.9% and a tensile strength of 1,100 lb./sq. in. At the same time, dielectric constants, dissipation factor and volume resistivity of the copolymers compared favorably with those for polyethylene.

Copolymers of $\alpha,\alpha$-dimethyl-m-isopropenyl benzyl isocyanate with $\alpha$-olefins of 2–8 carbons are particularly useful and therefore constitute a preferred embodiment of this invention. Such copolymers can be prepared by conventional addition polymerization techniques, as illustrated in Example XVIII. These copolymers not only form self-supporting films, as illustrated in Example XVIII, but due to their superior adhesive properties, they may also be cast upon various substrates to form an adherent coating thereon. For example, ethylene/$\alpha,\alpha$-dimethyl-m-isopropenyl benzyl isocyanate copolymers containing about 1 to 4% isocyanate, when melt-pressed on cellophane or aluminum foil at 170° C. and 20 tons pressure, adhere firmly to the substrate. In contrast, ethylene homopolymer of equal molecular weight does not exhibit these adhesive properties. The utility of the subject copolymers is not, however, limited to the preparation of films or coatings but extends as well to the preparation of molded articles, and to the preparation of other highly useful polymers by post-reaction techniques as illustrated by the following example.

Example XIX

The copolymers obtained in Example XVIII were post-reacted with aniline, phenol, ethanol, n-butylamine, and distilled water to give the corresponding derivatives of the isocyanate group. The reaction was carried out in two different ways. First, to a solution of one gram of the copolymer in 100 ml. of benzene at reflux temperature was added one gram of the hydroxyl or amine-containing reagent and three drops of dibutyltin dilaurate as catalyst. After refluxing for four hours, the mixture was cooled to precipitate the polymer. Substantially complete reaction was noted by disappearance of the isocyanate absorption band in the infrared. The second method consisted in mixing one gram of ethylene/$\alpha,\alpha$-dimethyl-m-isopropenyl benzyl isocyanate with three drops of the amine or hydroxyl-containing reactant with one drop of bibutyltin dilaurate as catalyst. The mixture was then melt-pressed by heating at 150° C. for about 75 seconds.

The post-reaction products thus prepared are particularly useful in the form of self-supporting films and coatings.

When the second method above (melt-pressing) was repeated using bifunctional reagents such as ethylenediamine, ethylene glycol and polyethylene glycol instead of the monofunctional reagents, very tough, crosslinked films were obtained.

Other polymers of the isocyanates of Formula 3 above, including homopolymers as well as copolymers, can be post-reacted by following the procedures illustrated in the above example.

The isocyanates of this invention, i.e., those of Formulas 3 and 4, have an unusual combination of properties, many of which have been illustrated hereinabove. Most of these properties are not possessed by the airylene isocyanates known heretofore. For example, the diisocyanates of Formula 4 are stable in the presence of water for periods of several weeks at ordinary temperatures. At high temperatures (e.g., above 80° C.) as well as high pH or after two months or more, they react with water to give polyureas useful for molded objects. Derivatives, or reaction products, e.g., polymers, ureas, etc., are light stable. Furthermore, they have little tendency to undergo dimerization or trimerization on standing. In contrast to these properties, arylene diisocyanates heretofore available are usually relatively unstable on standing or in the presence of water, are thermally unstable and absorb light energy with resultant degradation.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound having the formula $$OCN(CH_3)_2C—Arylene—C(CH_3)_2NCO$$

wherein Arylene contains up to 12 carbons and is selected from the group consisting of hydrocarbyl and substituted hydrocarbyl wherein the substituent is selected from the group halogen, hydrocarbyloxy and hydrocarbylcarboxy.

2. The compound of claim 1 wherein arylene is p-phenylene.

3. A compound of the group consisting of $$H_2C=C(CH_3)—Arylene—C(CH_3)_2NCO$$

and $$OCN(CH_3)_2C—Arylene—C(CH_3)_2NCO$$

wherein Arylene contains up to 12 carbons and is selected from the group consisting of hydrocarbyl and substituted hydrocarbyl wherein the substituent is selected from the group halogen, hydrocarbyloxy, and hydrocarbylcarboxy.

4. α,α-Dimethyl-m-isopropenyl benzyl isocyanate.

5. In a process for making isocyanates, the steps of reacting isocyanic acid with a vinylidene compound of the formula

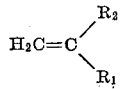

where $R_1$ is selected from the group consisting of hydrogen and hydrocarbyl of up to 12 carbons, $R_2$ contains up to 12 carbons and is selected from the group consisting of hydrocarbyl and substituted hydrocarbyl wherein the substituent is selected from the group halogen, hydrocarbyloxy, and hydrocarbylcarboxy and is bonded to a carbon atom at least two atoms removed from the depicted ethylenic linkage, and $R_1$ and $R_2$ conjointly ($—R_1—R_2—$) are a hydrocarbylene group of 2 to 12 carbons, at a temperature between about 75 and 150° C., in the presence of an acid catalyst, and thereafter separating said isocyanate.

6. In a process for making isocyanates, the steps of reacting isocyanic acid with a vinylidene compound of the formula

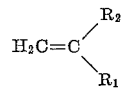

where $R_1$ is selected from the group consisting of hydrogen and hydrocarbyl of up to 12 carbons, $R_2$ contains up to 12 carbons and is selected from the group consisting of hydrocarbyl and substituted hydrocarbyl wherein the substituent is selected from the group halogen, hydrocarbyloxy, and hydrocarbylcarboxy and is bonded to a carbon atom at least two atoms removed from the depicted ethylenic linkage, and $R_1$ and $R_2$ conjointly ($—R_1—R_2—$) are a hydrocarbylene group of 2 to 12 carbons, at a temperature between about 25 and 200° C., in the presence of a strong acid catalyst, and thereafter separating said isocyanate.

7. The process of claim 6 wherein the vinylidene compound is α-methylstyrene.

8. The process of claim 6 wherein the vinylidene compound is p-methoxy-α-methylstyrene.

9. The process of claim 6 wherein the vinylidene compound is styrene.

10. The process of claim 6 wherein the vinylidene compound is isobutylene.

11. The process of claim 6 wherein the vinylidene compound is m-diisopropenylbenzene.

12. The process of claim 6 wherein the vinylidene compound is p-diisopropenylbenzene.

References Cited by the Examiner

UNITED STATES PATENTS

| | | | |
|---|---|---|---|
| 1,992,533 | 2/1953 | Lee | 260—454 |
| 2,394,597 | 2/1946 | Dickey et al. | 260—453 |
| 2,503,209 | 4/1950 | Nyquist et al. | 260—453 |
| 2,511,544 | 6/1950 | Rinke et al. | 260—77.5 |
| 2,606,892 | 8/1952 | Kropa | 260—80.3 |
| 2,611,782 | 9/1952 | Bortnick | 260—450 |
| 2,723,265 | 11/1955 | Stallmann | 260—453 |
| 2,861,982 | 11/1958 | Mino | 260—80 |
| 2,866,774 | 12/1958 | Price | 260—77.5 |
| 3,050,504 | 8/1962 | Herman et al. | 260—80 |

OTHER REFERENCES

Luskin et al.: J.A.C.S., vol 78, pages 4965–7 (1956).

CHARLES B. PARKER, *Primary Examiner.*

LEON J. BERCOVITZ, *Examiner.*

M. C. JACOBS, D. R. MAHANAND,
*Assistant Examiners.*